US012609040B2

(12) United States Patent
Qiu et al.

(10) Patent No.: US 12,609,040 B2
(45) Date of Patent: Apr. 21, 2026

(54) APPARATUSES AND METHODS FOR UNMANNED AERIAL VEHICLES COLLISION AVOIDANCE

(71) Applicant: Nokia Solutions and Networks Oy, Espoo (FI)

(72) Inventors: Genliang Qiu, Qingdao (CN); Xin Wang, Qingdao (CN); Guiyang Wu, Qingdao (CN); Dawei Liu, Qingdao (CN)

(73) Assignee: Nokia Solutions And Networks Oy, Espoo (FI)

( * ) Notice: Subject to any disclaimer, the term of this patent is extended or adjusted under 35 U.S.C. 154(b) by 617 days.

(21) Appl. No.: 17/641,144

(22) PCT Filed: Sep. 19, 2019

(86) PCT No.: PCT/CN2019/106596
§ 371 (c)(1),
(2) Date: Mar. 8, 2022

(87) PCT Pub. No.: WO2021/051333
PCT Pub. Date: Mar. 25, 2021

(65) Prior Publication Data
US 2022/0292995 A1 Sep. 15, 2022

(51) Int. Cl.
*G08G 5/80* (2025.01)
*G08G 5/26* (2025.01)
(Continued)

(52) U.S. Cl.
CPC ................. *G08G 5/80* (2025.01); *G08G 5/26* (2025.01); *G08G 5/55* (2025.01); *G08G 5/57* (2025.01)

(58) Field of Classification Search
CPC .... G08G 5/045; G08G 5/0013; G08G 5/0069; G08G 5/0043; G08G 5/0052;
(Continued)

(56) References Cited

U.S. PATENT DOCUMENTS

2010/0121574 A1 5/2010 Ariyur et al.
2011/0195710 A1* 8/2011 Nas ......................... H04W 8/18 455/432.3
(Continued)

FOREIGN PATENT DOCUMENTS

CN 102227647 A 10/2011
CN 102393747 A 3/2012
(Continued)

OTHER PUBLICATIONS

Extended European Search Report received for corresponding European Patent Application No. 19945494.3, dated May 31, 2023, 9 pages.
(Continued)

*Primary Examiner* — Brian P Sweeney
(74) *Attorney, Agent, or Firm* — DITTHAVONG, STEINER, & MLOTKOWSKI

(57) ABSTRACT

Apparatuses and methods for unmanned aerial vehicle collision avoidance are provided. An example method (200) may include receiving first information on presence of a first unmanned aerial vehicle in a first tracking area (210), determining a first number of unmanned aerial vehicles in the first tracking area and at least one tracking area neighboring the first tracking area (220), and notifying the first unmanned aerial vehicle to send live positioning information in a first frequency in a case where the first number is one (230). Related apparatuses, unmanned aerial vehicles, methods performed by the unmanned aerial vehicles, and computer readable medium are also disclosed.

19 Claims, 12 Drawing Sheets

(51) Int. Cl.
*G08G 5/55* (2025.01)
*G08G 5/57* (2025.01)

(58) Field of Classification Search
CPC . G08G 5/0082; H04B 7/18506; H04W 4/021; H04W 4/44
See application file for complete search history.

(56) References Cited

U.S. PATENT DOCUMENTS

| | | | | |
|---|---|---|---|---|
| 2012/0092208 | A1 | 4/2012 | LeMire et al. | |
| 2012/0182160 | A1* | 7/2012 | Hod | G08G 1/0116 340/936 |
| 2013/0173114 | A1* | 7/2013 | Pillai | B60W 10/18 701/41 |
| 2015/0142211 | A1 | 5/2015 | Shehata et al. | |
| 2017/0242431 | A1 | 8/2017 | Dowlatkhah et al. | |
| 2018/0096611 | A1 | 4/2018 | Kikuchi et al. | |
| 2018/0165970 | A1 | 6/2018 | Namgoong et al. | |
| 2018/0330624 | A1* | 11/2018 | Gong | H04W 12/122 |
| 2019/0150167 | A1 | 5/2019 | Lee et al. | |
| 2019/0197907 | A1 | 6/2019 | Beard et al. | |

FOREIGN PATENT DOCUMENTS

| | | | |
|---|---|---|---|
| CN | 105607645 | A | 5/2016 |
| CN | 106249752 | A | 12/2016 |
| CN | 106714185 | A | 5/2017 |
| CN | 106842265 | B | 6/2017 |
| CN | 106843273 | A | 6/2017 |
| CN | 106982120 | A | 7/2017 |
| CN | 107016882 | A | 8/2017 |
| CN | 107430402 | A | 12/2017 |
| CN | 107911866 | A | 4/2018 |
| CN | 108475068 | A | 8/2018 |
| CN | 108684204 | A | 10/2018 |
| CN | 108700882 | A | 10/2018 |
| CN | 108803667 | A | 11/2018 |
| CN | 108880724 | A | 11/2018 |
| CN | 108885461 | A | 11/2018 |
| CN | 109508035 | A | 3/2019 |
| CN | 109782797 | A | 5/2019 |
| DE | 102018102112 | A1 | 8/2019 |
| FR | 2756960 | A1 | 6/1998 |
| JP | 2017117018 | A | 6/2017 |
| KR | 20170030442 | A | 3/2017 |
| WO | 2019/034585 | A1 | 2/2019 |
| WO | 2019/153691 | A1 | 8/2019 |

OTHER PUBLICATIONS

"3rd Generation Partnership Project; Technical Specification Group Services and System Aspects; Unmanned Aerial System support in 3GPP; Stage 1; Release 16", 3GPP TS 22.125, V16.0.0, Dec. 2018, pp. 1-9.
"3rd Generation Partnership Project; Technical Specification Group Radio Access Network; Study on Enhanced LTE Support for Aerial Vehicles (Release 15)", 3GPP TR 36.777, V15.0.0, Dec. 2017, pp. 1-89.
"3rd Generation Partnership Project; Technical Specification Group Services and System Aspects; Remote Identification of Unmanned Aerial Systems; Stage 1 (Release 16)", 3GPP TR 22.825, V16.0.0, Sep. 2018, pp. 1-22.
"3rd Generation Partnership Project; Technical Specification Group Services and System Aspects; Study on Enhancement for Unmanned Aerial Vehicles; Stage 1 (Release 17)", 33GPP TR 22.829, V1.0.0, Mar. 2019, 43 pages.
Lao et al., "Cooperative Multi-UAV Collision Avoidance Based on Distributed Dynamic Optimization and Causal", Applied Sciences, vol. 7, No. 1, 2017, pp. 1-14.
Yu et al., "Collision Avoidance for Cooperative UAVs with Rolling Optimization Algorithm Based on Predictive State Space", Applied Sciences, vol. 7, No. 4, 2017, pp. 1-15.
International Search Report and Written Opinion received for corresponding Patent Cooperation Treaty Application No. PCT/CN2019/106596, dated Jun. 24, 2020, 10 pages.
Office Action received for corresponding Chinese Patent Application No. 201980100545.0, dated Jan. 10, 2024, 18 pages of Office Action and no page of translation available.
Office Action for related European Application No. 19945494.3-1009, dated Jul. 2, 2025, 7 pages.

* cited by examiner

APPARATUSES AND METHODS FOR UNMANNED AERIAL VEHICLES COLLISION AVOIDANCE

RELATED APPLICATION

This application was originally filed as PCT Application No. PCT/CN2019/106596 on Sep. 19, 2019, each of which is incorporated herein by reference in its entirety.

TECHNICAL FIELD

Various example embodiments relate to apparatuses and methods for unmanned aerial vehicle collision avoidance.

BACKGROUND

An Unmanned Aerial Vehicle (UAV), or a drone, may be a mobile enabled device, for example with a Subscriber Identification Module (SIM) card installed, so that the UAV may be connected to a mobile network or telecommunication network, such as a 4G, 5G, or networks to be developed in the future, and may be controlled by Unmanned Aerial System Traffic Management (UTM) via the mobile network or telecommunication network.

The UTM is a 3GPP entity responsible for functions including for example authorization and traffic management for UAVs. To keep UAVs separated from each other and also from the few aircraft such as low flying helicopters with which they may need to share the airspace, the UTM provides an Unmanned Aerial Vehicle Collision Avoidance System (UCAS) service based on accurate live positioning information continuously into the UTM from UAVs via 3GPP network, with at least a periodicity of 1 update per second as suggested in 3GPP Rel-16 technical reports.

SUMMARY

In a first aspect, disclosed is a method. The method may include receiving first information on presence of a first unmanned aerial vehicle (UAV) in a first tracking area (TA), determining a first number of UAVs in the first TA and at least one TA neighboring the first TA, and notifying the first UAV to send live positioning information in a first frequency in a case where the first number is one. In an example embodiment, the method may be performed on the side of UTM for UAV collision avoidance.

In some example embodiments, the method may further include notifying the first UAV to send the live positioning information in a second frequency greater than the first frequency in a case where the first number is greater than one.

In some example embodiments, the method may further include notifying the other one or more UAVs in the first TA and the at least one neighboring TA than the first UAV to send the live positioning information in a third frequency greater than the first frequency in the case where the first number is greater than one.

In some example embodiments, the first information indicates that the first UAV enters into the first TA from a second TA.

In some example embodiments, the method may further include: in a case where a second UAV is within a third TA neighboring the second TA, determining a second number of UAVs in the third TA and at least one TA neighboring the third TA; and notifying the second UAV to send the live positioning information in the first frequency in a case where the second number is one.

In some example embodiments, the first frequency may have a zero value indicating a stop of sending live positioning information.

In some example embodiments, the method may further include receiving first live positioning information and second live positioning information from two UAVs in the same TA or two adjacent TAs, respectively, estimating a risk of collision between the two UAVs based on the first live positioning information and the second live positioning information, and issuing a route change command to at least one of the two UAVs in a case where the risk is above a threshold.

In some example embodiments, each UAV may be a Mobile Enabled Device communicating with Unmanned Aerial System Traffic Management via a Core Network.

In some example embodiments, the first information may be received from the first UAV via the Core Network.

In some example embodiments, the first information may be received from the Core Network in a case where the first UAV moves into the first TA.

In some example embodiments, each TA may include one or more cells in a telecommunication network.

In some example embodiments, the at least one TA neighboring the first TA may include at least one TA neighboring the first TA directly and/or indirectly.

In a second aspect, disclosed is an apparatus. The apparatus may include at least one processor and at least one memory including computer program code, the at least one memory and the computer program code being configured to, with the at least one processor, cause the apparatus to perform at least the above method.

In some example embodiments, the apparatus may be at least a part of an Unmanned Aerial System Traffic Management server, and each UAV being a Mobile Enabled Device communicating with the Unmanned Aerial System Traffic Management server via a Core Network.

In a third aspect, disclosed is an apparatus. The apparatus may include a first circuitry configured to receive first information on presence of a first UAV in a first TA, a second circuitry configured to determine a first number of UAVs in the first TA and at least one TA neighboring the first TA, and a third circuitry configured to notify the first UAV to send live positioning information in a first frequency in a case where the first number is one.

In some example embodiments, the third circuitry in the apparatus may be further configured to notify the first UAV to send the live positioning information in a second frequency greater than the first frequency in a case where the first number is greater than one.

In some example embodiments, the third circuitry in the apparatus may be further configured to notify the other one or more UAVs in the first TA and the at least one neighboring TA than the first UAV to send the live positioning information in a third frequency greater than the first frequency in the case where the first number is greater than one.

In some example embodiments, the first information may indicate that the first UAV enters into the first TA from a second TA.

In some example embodiments, the second circuitry in the apparatus may be further configured to, in a case where a second UAV is within a third TA neighboring the second TA, determine a second number of UAVs in the third TA and at least one TA neighboring the third TA, and the third circuitry in the apparatus may be further configured to notify the second UAV to send the live positioning information in the first frequency in a case where the second number is one.

In some example embodiments, the first frequency may have a zero value indicating a stop of sending live positioning information.

In some example embodiments, the apparatus may further include a fourth circuitry configured to receive first live positioning information and second live positioning information from two UAVs in the same TA or two adjacent TAs, respectively, a fifth circuitry configured to estimate a risk of collision between the two UAVs based on the first live positioning information and the second live positioning information, and a sixth circuitry configured to issue a route change command to at least one of the two UAVs in a case where the risk is above a threshold.

In some example embodiments, the apparatus may be at least a part of an Unmanned Aerial System Traffic Management server, each UAV being a Mobile Enabled Device communicating with the Unmanned Aerial System Traffic Management server via a Core Network.

In some example embodiments, the first information may be received from the first UAV via the Core Network.

In some example embodiments, the first information may be received from the Core Network in a case where the first UAV moves into the first TA.

In some example embodiments, each TA may include one or more cells in a telecommunication network.

In a fourth aspect, disclosed is a method performed by a UAV. The method may include receiving information on a frequency for sending live positioning information, and controlling sending of the live positioning information based on the received information.

In some example embodiments, sending of the live positioning information may be stopped in a case where the frequency has a zero value.

In some example embodiments, the method may further include sending information indicating that the UAV enters into a first tracking area from a second tracking area.

In some example embodiments, each tracking area may include one or more cells in a telecommunication network.

In some example embodiments, the UAV may be a Mobile Enabled Device communicating with Unmanned Aerial System Traffic Management server via a Core Network.

In a fifth aspect, disclosed is a UAV. The UAV may include at least one processor and at least one memory including computer program code, the at least one memory and the computer program code being configured to, with the at least one processor, cause the UAV to perform at least the above method on the side of the UAV.

In a sixth aspect, disclosed is a UAV. The UAV may include a first circuitry configured to receive information on a frequency for sending live positioning information, and a second circuitry configured to control sending of the live positioning information based on the received information.

In some example embodiments, the second circuitry in the UAV may be configured to stop sending of the live positioning information in a case where the frequency has a zero value.

In some example embodiments, the UAV may further include a third circuitry configured to send information indicating that the UAV enters into a first tracking area from a second tracking area.

In some example embodiments, each TA may include one or more cells in a telecommunication network.

In some example embodiments, the UAV may be a Mobile Enabled Device communicating with Unmanned Aerial System Traffic Management server via a Core Network.

In a seventh aspect, disclosed is a method. The method many include determining presence of a first UAV in a first TA, and sending first information on the first TA and a second TA, the first UAV entering into the first TA from the second TA. For example, the method may be performed on the side of a Core Network.

In some example embodiments, the first information is sent from the Core Network to an Unmanned Aerial System Traffic Management server.

In some example embodiments, each TA may include one or more cells in a telecommunication network.

In an eighth aspect, disclosed is an apparatus. The apparatus may include at least one processor and at least one memory including computer program code, the at least one memory and the computer program code being configured to, with the at least one processor, cause the apparatus to perform determining presence of a first UAV in a first TA, and sending first information on the first TA and a second TA, the first UAV entering into the first TA from the second TA.

In some example embodiments, the first information may be sent to an Unmanned Aerial System Traffic Management server.

In some example embodiments, each TA may include one or more cells in a telecommunication network.

In some example embodiments, the apparatus may be at least a part of a Core Network.

In a ninth aspect, disclosed is a computer readable medium. The computer readable medium may include instructions stored thereon for causing an apparatus or a UAV to perform at least any of the above method.

In a tenth aspect, disclosed is a system. The system may include at least one above UAV including a first UAV, and an above apparatus for UAV traffic management. The apparatus may be configured to, in response to receiving first information on presence of the first UAV in a first tracking area (TA), notify the first UAV to send live positioning information in a first frequency in a case where a first number of UAVs in the first TA and at least one TA neighboring the first TA is one. The first UAV may be configured to control sending of the live positioning information based on a notification from the apparatus on sending live positioning information in the first frequency.

In some example embodiments, in the system, the apparatus may be further configured to notify the first UAV to send the live positioning information in a second frequency greater than the first frequency in a case where the first number is greater than one.

In some example embodiments, in the system, the apparatus may be further configured to notify the other one or more UAVs in the first TA and the at least one neighboring TA than the first UAV to send the live positioning information in a third frequency greater than the first frequency in the case where the first number is greater than one.

In some example embodiments, in the system, the first information may indicate that the first UAV enters into the first TA from a second TA.

In some example embodiments, in the system, the apparatus may be further configured to notify a second UAV of the at least one UAV to send the live positioning information in the first frequency in a case where the second UAV is within a third TA neighboring the second TA and a second number of UAVs in the third TA and at least one TA neighboring the third TA is one.

In some example embodiments, in the system, the first UAV may be configured to stop sending of the live positioning information in a case where the first frequency has a zero value.

In some example embodiments, in the system, the apparatus may be at least a part of an Unmanned Aerial System Traffic Management server, and each of the at least one UAV may be a Mobile Enabled Device communicating with the apparatus via a Core Network.

In some example embodiments, in the system, each TA may include one or more cells in a telecommunication network.

In some example embodiments, in the system, the first information may be received from the first UAV via the Core Network.

In some example embodiments, in the system, the first information may be received from the Core Network in a case where the first UAV moves into the first TA.

In some example embodiments, the system may further include a device of the Core Network, the device being configured to determine presence of the first UAV in the first TA, and to send first information on the first TA and a second TA, the first UAV entering into the first TA from the second TA.

In some example embodiments, the at least one TA neighboring the first TA may include at least one TA neighboring the first TA directly and/or indirectly.

BRIEF DESCRIPTION OF THE DRAWINGS

Some example embodiments will now be described, by way of non-limiting examples, with reference to the accompanying drawings.

DETAILED DESCRIPTION

Figure 1:
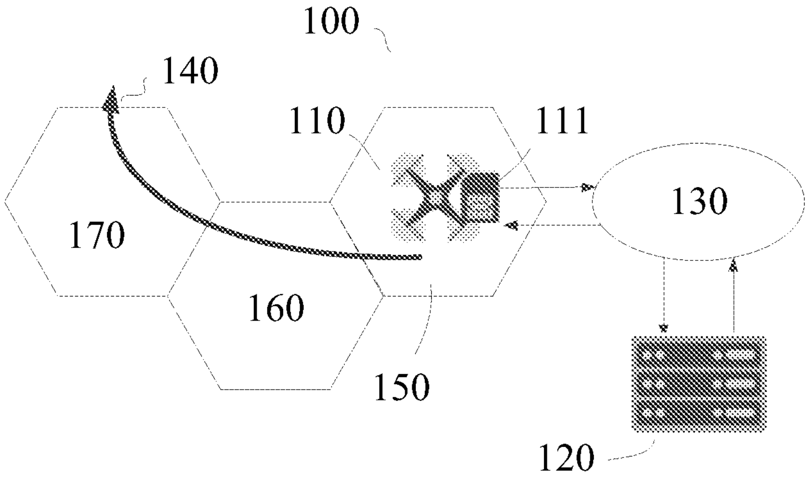
FIG. 1 shows an example scenario according to an example embodiment.

FIG. 1 shows an example scenario 100 wherein an UAV 110 may function as a mobile enabled device or an aerial User Equipment (UE), for example by including a suitable telecommunication module or circuitry, such as a SIM card 111, and may communicate with a UTM server 120 located at the Air Traffic Control Agency (ATAC), via a Core Network (CN) 130 of a mobile network or telecommunication network such as 4G, 5G, or networks to be developed in the future, or any other suitable mobile network or telecommunication network.

In the example scenario 100, a route 140 predetermined for the UAV 110 may cross one or more Tracking Areas (TAs), for example TAs 150, 160, and 170, as shown in FIG. 1.

A TA is a configuration at cell level for position management of a UE such as the UAV 110 as an aerial UE. Regions covered by the mobile network or telecommunication network may be divided into one or more TAs such as TAs 150, 160, and 170 in FIG. 1 wherein one TA may include or cover one or more cells in the mobile network or telecommunication network and one cell may belong to one TA. Each TA may be associated with a Tracking Area Identity (TAI) including a Tracking Area Code (TAC), which may be broadcasted with system message (SIB1) of a cell. For example, a TAI may include a code for Public Land Mobile Network (PLMN) and a TAC. For example, a TAI may include a Mobile Country Code (MCC), a Mobile Network Code (MNC), and a TAC.

A UE, such as the UAV 110 as an aerial UE, may initiate a procedure of attach or registration initial, for example by sending an attach request message or a registration initial request message to the Mobility Management Entity (MME) or an Access Management Function (AMF) in the CN 130, so as to obtain a TA list including one or more TAs (e.g. 1~16 TAs) from the CN. According to different strategies, a TA list may include a current TA where the UE is currently located and one or more TAs where the UE has passed or which has a high viscosity with the current TA.

When paging the UE, paging message may be sent to the UE in the one or more cells included in the TA list. The UE may compare the locally saved TA list with information of one or more TAs received through the broadcast message SIB1, so as to determine whether it moves into a new TA not included in the locally saved TA list. When the UE enters a new TA which is not in the locally saved TA list, the UE may initiate a procedure of Tracking Area Update (TAU), for example by sending a TAU request or a registration update request, so as to obtain an updated TA list form the CN 130. When the UE enters a TA which is in the locally saved TA list, the TAU may be omitted. Also, the UE in a TA may initiate a periodic TAU to notify the CN 130 that it is still alive.

To keep the UAV 110 separated from the other one or more UAVs (not shown in FIG. 1) and also from the other possible aircraft such as low flying helicopters with which they may need to share the airspace, for example, accurate live positioning information (LPI) of the UAV 110 and the other one or more UAVs may be provided continuously into the UTM server 120 via the CN 130, for example with a periodicity of 1 update per second. However, providing continuously LPI may result in for example a high traffic and workload on the side of the UTM server 120 and/or the UAV 110.

Various example embodiments of the present disclosure relate to a solution for UAV collision avoidance based on tacking UAV TA, wherein the UTM server may detect whether there are two UAVs in the same TA or two neighboring TAs, and may instruct the UAV to provide LPI in different frequencies or even stop providing LPI according to different detection results.

Figure 2:
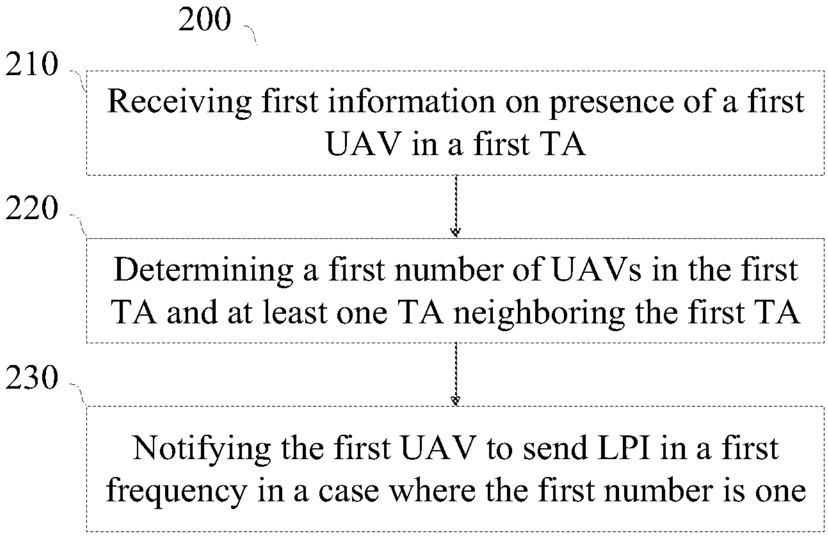
FIG. 2 shows an example method for UAV collision avoidance on the side of UTM according to an example embodiment.

FIG. 2 shows an example method 200 for UAV collision avoidance according to an example embodiment, which may be performed for example on the side of the UTM server 120.

As shown in FIG. 2, the example method 200 may include a step 210 of receiving first information on presence of a first UAV in a first TA, a step 220 of determining a first number of UAVs in the first TA and one or more TAs neighboring the first TA, and a step 230 of notifying the first UAV to send LPI in a first frequency when the first number is one.

In some example embodiments, the first information received at step 210 may be sent by the first UAV via the CN 130 to indicate that the first UAV enters into the first TA from a second TA or that the first UAV is powered on and takes off in the first TA. For example, the first information may include a first TAI of the first TA and a second TAI of the second TA. For example, the first TAI may include a field indicating a first MCC (e.g. 312 for the United States), a field indicating a first MNC (e.g. 770 for Verizon Wireless), and a field indicating a first TAC (e.g. 0x384 or 900), and the second TAI may include a field indicating a second MCC (e.g. 312 for the United States), a field indicating a second MNC (e.g. 770 for Verizon Wireless), and a field indicating a second TAC (e.g. 0x320 or 800). For example, when the first UAV is powered on and moves into the first TA identified as MCC-MNC-TAC/312-770-900 from the second TA identified as MCC-MNC-TAC/312-770-800, the TAI of MCC-MNC-TAC/312-770-900 of the first TA may be marked as a new TAI and the TAI of MCC-MNC-TAC/312-770-800 of the second TA may be marked as an old TAI, for example by Core Network. If the UAV initially takes off in the first TA MCC-MNC-TAC/312-770-900, the TAI of the second TA may be set to, for example, 0x0000, or 0xFFFE, or the same with the TAI of the first tA, for example by Core Network.

In various example embodiments, a neighboring TA of a TA may mean that the two TAs are neighboring with each other directly or indirectly.

In some example embodiments, the LPI may be information including a UAV location obtained by a Global Navigation Satellite System (GNSS) in the UAV, or any other suitable information indicating an absolute position or a relative position of the UAV. Various examples of GNSS may include, but not limited to, Global Positioning System (GPS), Galileo, GLONASS, Space Based Augmentation Systems (SBAS), Quasi Zenith Satellite System (QZSS), and BeiDou Navigation Satellite System (BDS).

In some example embodiments, the first frequency may be any suitable frequency for example lower than the frequency for providing LPI as suggested in 3GPP Rel-16 technical reports (i.e. a periodicity of 1 update per second), for example, a periodicity of 1 update per minute, a periodicity of 1 update per 5 minutes, a periodicity of 1 update per 10 minutes, and even may have a zero value indicating a stop of sending LPI. Also, the first frequency may be not limited to be uniform or linear. For example, the first frequency may be variable, for example, may be once in a first minute, twice in a second minute, and the like.

Figure 3:
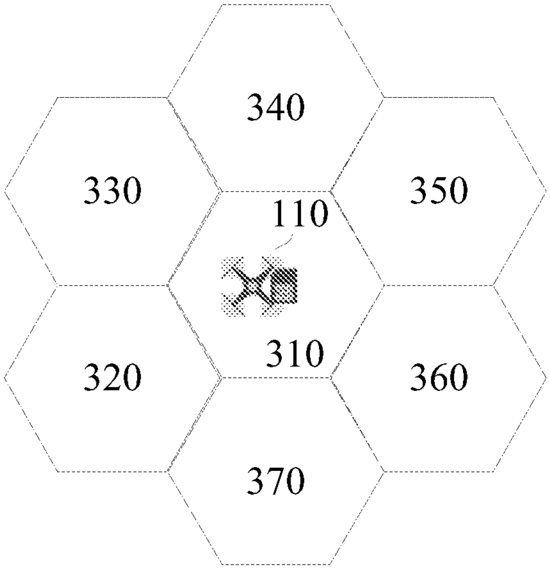
FIG. 3 shows an execution example of the example method in FIG. 2.

FIG. 3 shows an example scenario where the first UAV 110 is powered on and takes off in the first TA 310. In this case, the UAV 110 may send to the UTM server 120 the first information including the TAI of the first TA 310.

In response to receiving the first information on presence of the UAV 110 in the first TA 310 at the step 210, a first number of UAVs in the TA 310 and neighboring TAs 320-370 may be determined at the step 220 on the side of the UTM server 120.

If the determined first number is one as shown in FIG. 3, the example method 200 may proceed to the step 230 and notify the first UAV 110 to stop sending LPI, or to send LPI in a low frequency, for example, 1 update per 5 minutes.

Figure 4:
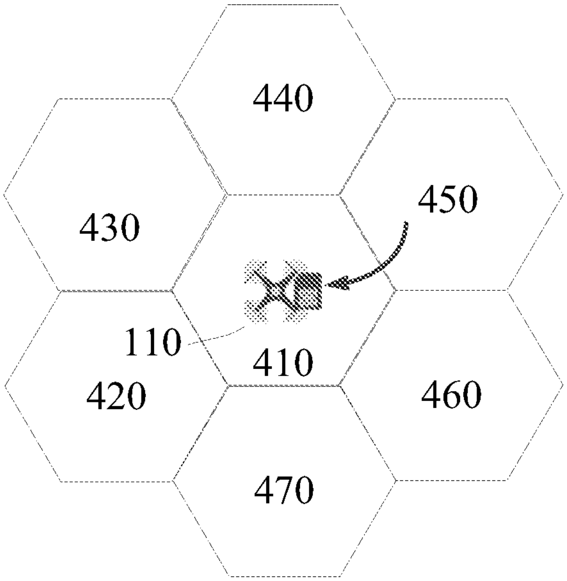
FIG. 4 shows another execution example of the example method in FIG. 2.

FIG. 4 shows another example scenario where the first UAV 110 enters into the first TA 410 from, for example, a second TA 450. In this case, the UAV 110 may send to the UTM server 120 the first information including the TAI of the first TA 410. For example, the first information may also include the TAI of the second TA 450.

In response to receiving the first information at the step 210, a first number of UAVs in the first TA 410 and neighboring TAs 420-470 may be determined at the step 220 on the side of the UTM server 120. When the first number is one as shown in FIG. 4, the example method 200 may proceed to the step 230 and notify the first UAV 110 to stop sending LPI, or to send LPI in the first frequency. In an example embodiment, the UTM server 120 may record information on whether the UAV 110 has been in a state of sending LPI in the first frequency, and the step 230 of notification may be implemented by performing no actions when the first UAV 110 is detected as being in a state of sending LPI in the first frequency.

As shown in the examples of FIG. 3 and FIG. 4, according to the example method 200, the UTM server 120 may detect the number of UAVs in the first TA and one or more neighboring TAs of the first TA in response to receiving the first information from the first UAV via the CN 130. When the detected number is one, the UTM server 120 may determine that there is no or a low risk of collision, without for example calculating a Euclidean distance between two UAVs by considering speed, direction, or trajectories of the two UAVs, and may notify the first UAV to send LPI in the first frequency which may be lower than for example the frequency for providing LPI continuously as suggested in 3GPP Rel-16 technical reports, or even to stop sending LPI. To this end, for example, the UTM traffic and workload may be reduced dramatically.

Figure 5:
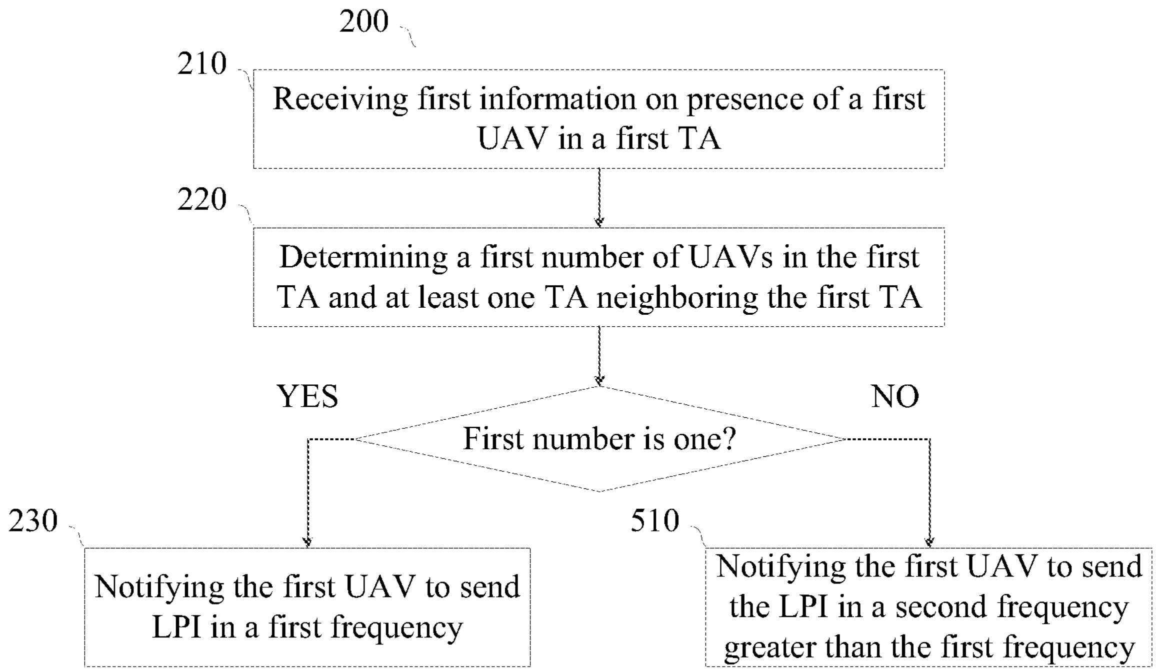
FIG. 5 shows another example method for UAV collision avoidance on the side of UTM according to an example embodiment.

In an example embodiment, as shown in FIG. 5, the example method 200 may further include a step of 510 of notifying the first UAV to send the LPI in a second frequency greater than the first frequency when the first number is greater than one.

Figure 6:
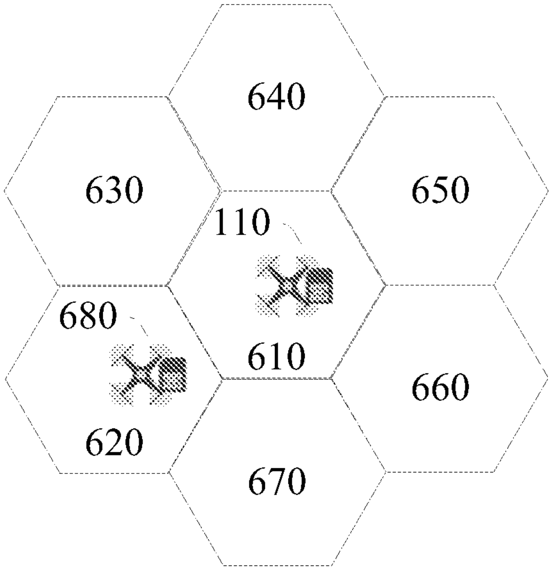
FIG. 6 shows another execution example of the example method in FIG. 5.

For example, as shown in FIG. 6, when the first UAV 110 enters into the first TA 610, the UAV 110 may send to the UTM server 120 the first information including the TAI of the first TA 610.

In response to receiving the first information, a first number of UAVs in the first TA 610 and neighboring TAs 620-670 may be determined at the step 220 on the side of the UTM server 120.

As shown in FIG. 6, there is one UAV 680 in the TA 620 so that the first number becomes 2, which is greater than 1. In this case, the example method 200 may proceed to the step 510 to notify the first UAV 110 to send LPI periodically, or to send LPI in a second frequency greater than the first frequency. For example, the second frequency may be the frequency for providing LPI as suggested in 3GPP Rel-16 technical reports, i.e. a periodicity of 1 update per second, or even higher, for example, a periodicity of 2 update per second, and the like. The second frequency may be not limited to be uniform or linear. For example, the second frequency may be variable, for example, may be once in a first second, twice in a second second, and the like.

Figure 7:
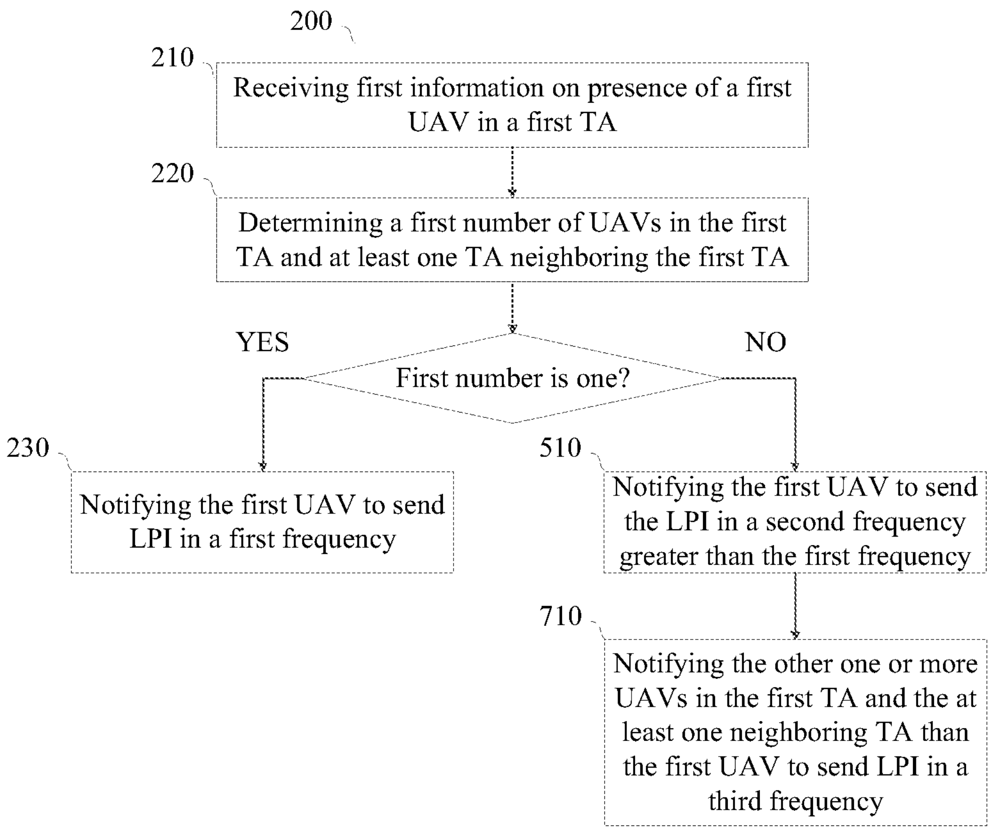
FIG. 7 shows another example method for UAV collision avoidance on the side of UTM according to an example embodiment.

Further, as shown in FIG. 7, in another example embodiment, the example method 200 may further include a step 710 of notifying the other one or more UAVs in the first TA and the one or more neighboring TAs than the first UAV to send LPI in a third frequency greater than the first frequency in the case where the first number is greater than one. For example, the third frequency may be the frequency for providing LPI as suggested in 3GPP Rel-16 technical reports, i.e. a periodicity of 1 update per second, or even higher, for example, a periodicity of 2 update per second, and the like. For example, the third frequency may the same with or different from the second frequency. Also, the third frequency may be not limited to be uniform or linear. For example, the third frequency may be variable, for example, may be once in a first second, twice in a second second, and the like.

For example, as shown in FIG. 6, if the UAV 680 in the TA 620 was not sending LPI periodically or was sending LPI in the first frequency to the UTM before the UAV 110 enters into the TA 170, for example due to the steps 210, 220, and 230 performed for the UAV 610 on the side of the UTM server 120, the UAV 680 may be notified by the UTM server 120 at the step 710 to send LPI in the third frequency after the first UAV 110 enters into the first TA 610.

When there is at least two UAVs in either one TA or two neighboring TAs, there is a risk of collision among the at least two UAVs. Through the step 510 in FIG. 5 and the step 710 in FIG. 7, any two UAVs with a risk of collision may be enabled to providing LPI continuously to the UTM server 120, so that UTM server 120 provide the UCAS service based on the accurate LPI.

As an example, the step 710 is shown as being executed after the step 510 in FIG. 7. In another example embodiment, the step 710 may be executed before or in parallel with the step 510. In another example embodiment, the steps 710 and 510 may be combined into one step.

Figure 8:
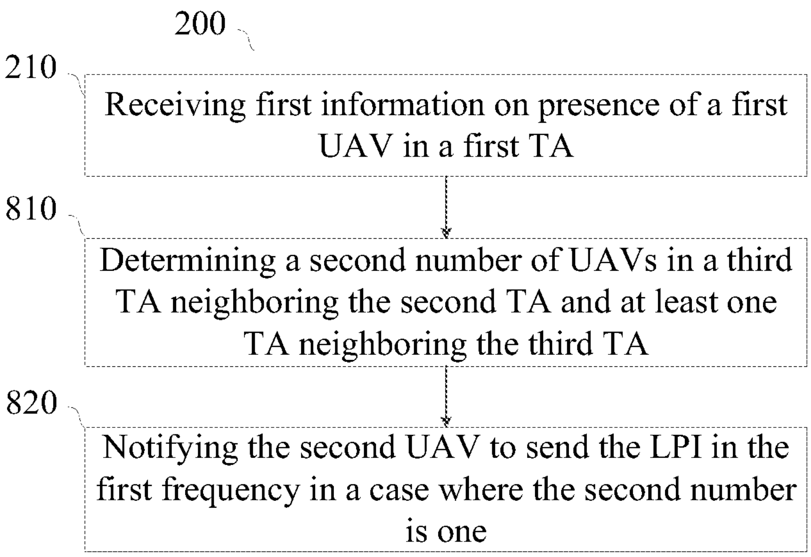
FIG. 8 shows another example method for UAV collision avoidance on the side of UTM according to an example embodiment.

Further, as shown in FIG. 8, in another example embodiment, in response to or after the step 210 of receiving the first information indicating that the first UAV enters into the first TA from the second TA, the example method 200 may further include a step 810 of determining a second number of UAVs in a third TA neighboring the second TA and one or more TAs neighboring the third TA wherein there is a second UAV is within the third TA, and a step 820 of notifying the second UAV to send the LPI in the first frequency when the second number is one.

Figure 9:
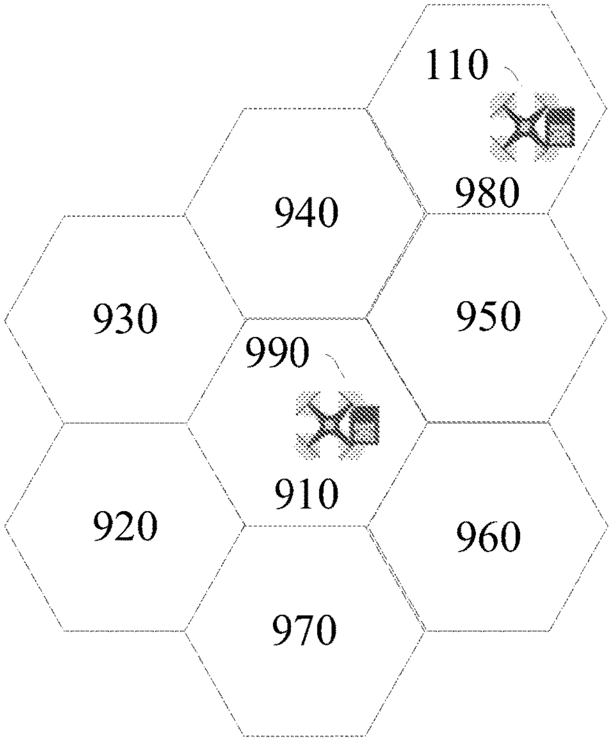
FIG. 9 shows another execution example of the example method in FIG. 8.

For example, as shown in FIG. 9, when the first UAV 110 moves into the first TA 980 from, for example, the second TA 950, and there is one second UAV 990 in the third TA 910. In this case, the UAV 110 may send to the UTM server 120 the first information including the TAI of the first TA 980 and the TAI of the second TA 910.

In response to the first information received at the step 210, a second number of UAVs in the third TA 910 and neighboring TAs 920-970 may be determined at the step 810 on the side of the UTM server 120.

As shown in FIG. 9, there is one UAV, i.e. the second UAV 990, in the TAs 910-970, that is, the second number is one. Thus, the example method 200 may proceed to the step 820 and notify the second UAV 990 to stop sending LPI periodically, or to send LPI in the first frequency. To this end, for example, the UTM traffic and workload may be further reduced.

Figure 10:
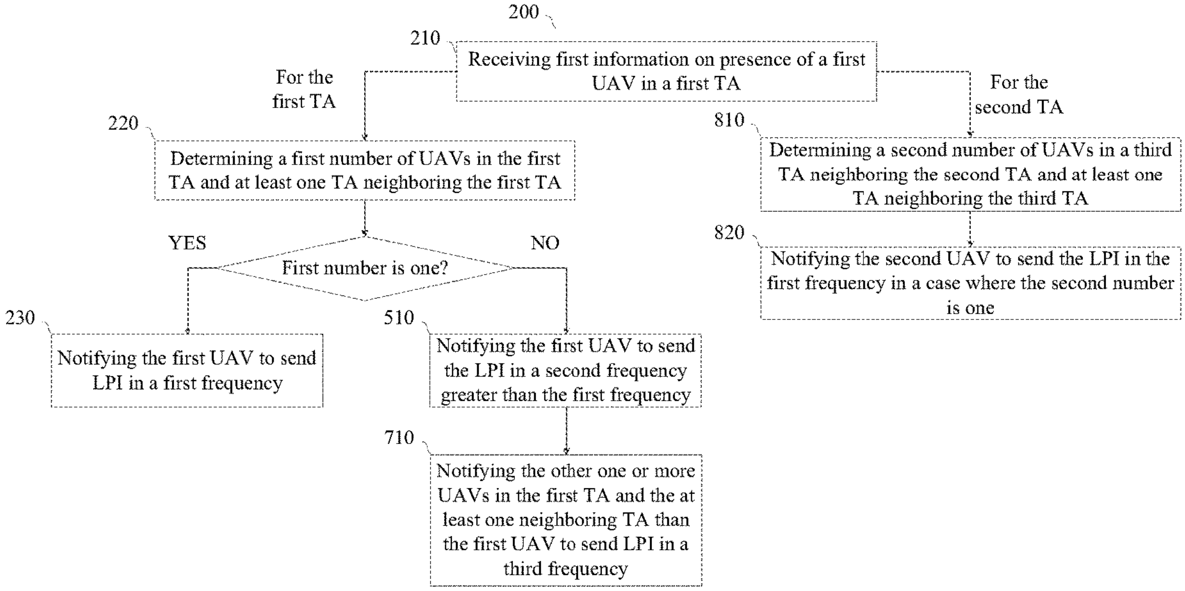
FIG. 10 shows another example method for UAV collision avoidance on the side of UTM according to an example embodiment.

FIG. 10 shows an example combination of FIG. 2, FIG. 5, FIG. 7, and FIG. 9. However, the disclosure is not limited to the above examples.

Through the example method 200 according various example embodiments, a UAV, at least the first UAV, may be notified or controlled to stop providing LPI periodically or to provide LPI in the first frequency when no other UAV is found in both the same TA and any neighboring TA, or to provide LPI in a frequency greater than the first frequency when there is at least one other UAV is found in the same TA or any neighboring TA, rather than providing LPI continuously into UTM in the second or third frequency. On the side of the UTM server, for example, at least the calculations for a Euclidean distance between two UAVs may be reduced so that the UTM traffic and workload may be reduced.

For those UAVs with a risk of loss of separation, for example those UAVs in the same TA or neighboring TAs, the example method 200 may further include receiving first live positioning information and second live positioning information from two UAVs in the same TA or two adjacent TAs, respectively, estimating a risk of collision between the two UAVs based on the first live positioning information and the second live positioning information, and issuing a route change command to at least one of the two UAVs when the risk is above a threshold. These steps may be executed for example after the step 510 and/or step 710 and for any two or more UAVs sending LPI in a frequency greater than the first frequency.

Figure 11:
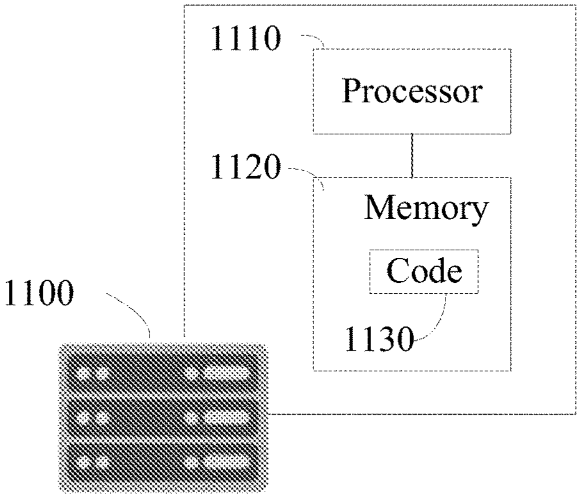
FIG. 11 shows an example apparatus for UAV collision avoidance on the side of UTM according to an example embodiment.

FIG. 11 shows an example apparatus 1100 according to an example embodiment, which, for example, may be at least a part of the UTM server 120.

As shown in FIG. 11, the example apparatus 1100 may include at least one processor 1110 and at least one memory 1120 that may include computer program code 1130. The at least one memory 1120 and the computer program code 1130 may be configured to, with the at least one processor 1110, cause the apparatus 1100 at least to perform at least the example method 200 described above.

In various example embodiments, the at least one processor 1110 in the example apparatus 1100 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1110 may also include at least one other circuitry or element not shown in FIG. 11.

In various example embodiments, the at least one memory 1120 in the example apparatus 1100 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1120 may include, but are not limited to, an electric, a magnetic, an optical, an electromagnetic, an infrared, or a semiconductor system, apparatus, or device or any combination of the above.

Further, in various example embodiments, the example apparatus 1100 may also include at least one other circuitry, element, and interface, for example at least one I/O interface, at least one antenna element, and the like.

In various example embodiments, the circuitries, parts, elements, and interfaces in the example apparatus 1100, including the at least one processor 1110 and the at least one memory 1120, may be coupled together via any suitable connections including, but not limited to, buses, crossbars, wiring and/or wireless lines, in any suitable ways, for example electrically, magnetically, optically, electromagnetically, and the like.

Figure 12:
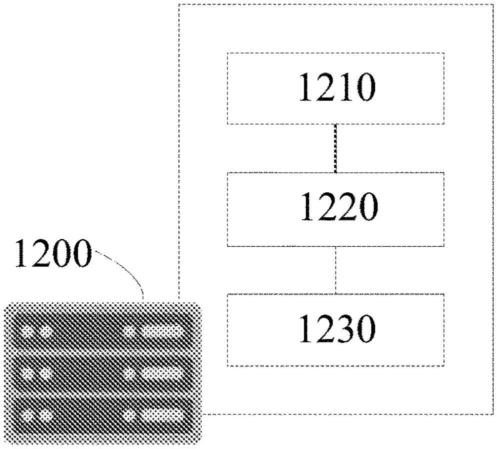
FIG. 12 shows another example apparatus for UAV collision avoidance on the side of UTM according to an example embodiment.

FIG. 12 shows another example apparatus 1200 according to an example embodiment, which, for example, may be at least a part of the UTM server 120, and may include circuitries coupled together and configured to perform for example the example method 200.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

As shown in FIG. 12, the example apparatus 1200 may include a circuitry 1210 configured to receive first information on presence of the first UAV in the first TA (i.e. to perform the step 210 of the example method 200), a circuitry 1220 configured to determine the first number of UAVs in the first TA and one or more TAs neighboring the first TA (i.e. to perform the step 220 of the example method 200), and a circuitry 1230 configured to notify the first UAV to send live positioning information in the first frequency when the first number is one (i.e. to perform the step 230 of the example method 200).

In an example embodiment, the circuitry 1230 may be further configured to notify the first UAV to send the live positioning information in a second frequency greater than the first frequency when the first number is greater than one (i.e. to perform the step 510 of the example method 200).

In an example embodiment, the circuitry 1230 may be further configured to notify the other one or more UAVs in the first TA and the one or more neighboring TAs than the first UAV to send the live positioning information in the third frequency greater than the first frequency in the case where the first number is greater than one (i.e. to perform the step 710 of the example method 200).

In an example embodiment, the circuitry 1220 may be further configured to determine the second number of UAVs in the third TA and one or more TAs neighboring the third TA when the second UAV is within the third TA neighboring the second TA (i.e. to perform the step 810 of the example method 200), and the circuitry 1230 is further configured to notify the second UAV to send the live positioning information in the first frequency when the second number is one (i.e. to perform the step 820 of the example method 200).

Figure 13:
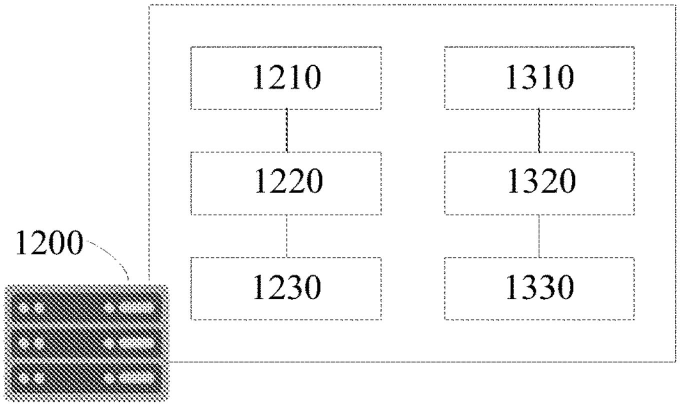
FIG. 13 shows another example apparatus for UAV collision avoidance on the side of UTM according to an example embodiment.

In an example embodiment, as shown in FIG. 13, the example apparatus 1200 may further include a circuitry 1310 configured to receive first live positioning information and second live positioning information from two UAVs in the same TA or two adjacent TAs, respectively, a circuitry 1320 configured to estimate a risk of collision between the two UAVs based on the first live positioning information and the second live positioning information, and a circuitry 1330 configured to issue a route change command to at least one of the two UAVs when the risk is above a threshold.

It is appreciated that the apparatus for UAV collision avoidance on the side of UTM of the disclosure is not limited to the above examples.

Figure 14:
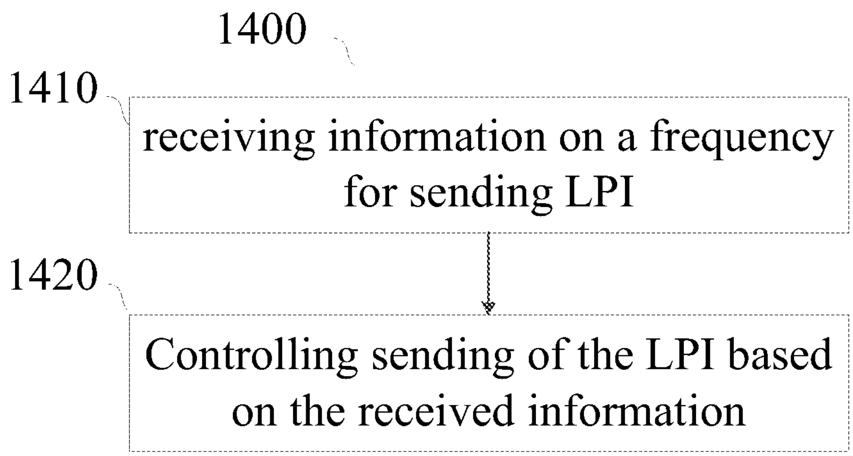
FIG. 14 shows an example method for UAV collision avoidance on the side of UAV according to an example embodiment.

FIG. 14 shows an example method 1400 for UAV collision avoidance according to an example embodiment, which may be performed by a UAV, for example the first UAV in the above examples.

As shown in FIG. 14, the example method 1400 may including a step 1410 of receiving information on a frequency for sending LPI, and a step 1420 of controlling sending of the LPI based on the received information. Corresponding to the example method 200, the frequency for sending LPI may be a frequency notified from the UTM, for example, the above first, second, or third frequency. For example, if the frequency is the first frequency with a zero value, the UAV may stop sending LPI.

Corresponding to the step 210 of the example method 200, the example method 1400 may further include sending information indicating that the UAV enters into the first TA from the second TA. This step may be executed before or after or in parallel with the step 1410 and/or the step 1420.

Figure 15:
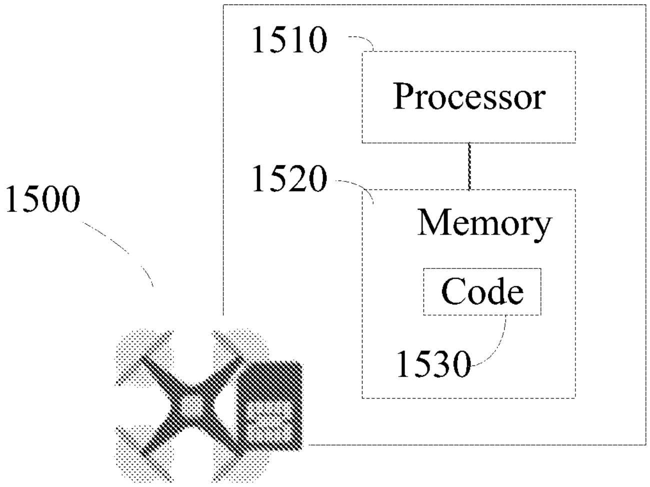
FIG. 15 shows an example UAV according to an example embodiment.

FIG. 15 shows an example UAV 1500 according to an example embodiment, which may function as a Mobile Enabled Device or an aerial UE, for example with a SIM card installed.

As shown in FIG. 15, the example UAV 1500 may include at least one processor 1510 and at least one memory 1520 that may include computer program code 1530. The at least one memory 1520 and the computer program code 1530 may be configured to, with the at least one processor 1510, cause the UAV 1500 at least to perform at least the example method 1400 described above.

In various example embodiments, the at least one processor 1510 in the example UAV 1500 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1510 may also include at least one other circuitry or element not shown in FIG. 15.

In various example embodiments, the at least one memory 1520 in the example UAV 1500 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1520 may include, but are not limited to, an electric, a magnetic, an optical, an electromagnetic, an infrared, or a semiconductor system, apparatus, or device or any combination of the above.

Further, in various example embodiments, the example UAV 1500 may also include at least one other circuitry, element, and interface, for example at least one I/O interface, at least one antenna element, and the like.

In various example embodiments, the circuitries, parts, elements, and interfaces in the example UAV 1500, including the at least one processor 1510 and the at least one memory 1520, may be coupled together via any suitable connections including, but not limited to, buses, crossbars, wiring and/or wireless lines, in any suitable ways, for example electrically, magnetically, optically, electromagnetically, and the like.

Figure 16:
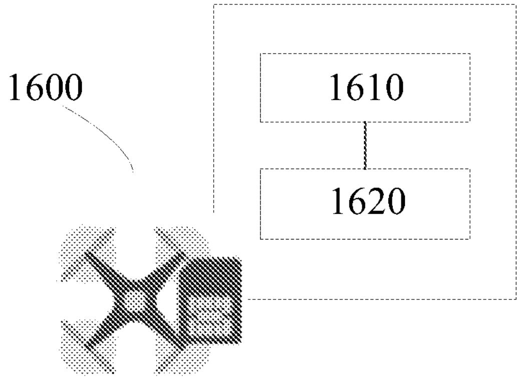
FIG. 16 shows another example UAV according to an example embodiment.

FIG. 16 shows another example UAV 1600 according to an example embodiment, which may include circuitries coupled together and configured to perform for example the example method 1400.

As shown in FIG. 16, the example UAV 1600 may include a circuitry 1610 configured to receive information on a frequency for sending live positioning information (i.e. to perform the step 1410 of the example method 1400), and a circuitry 1620 configured to control sending of the live positioning information based on the received information (i.e. to perform the step 1420 of the example method 1400). In another example embodiment, corresponding to the operations on the side of UTM, for example, the step 210 of the example method 200, the example UAV 1600 may further include a circuitry configured to send information indicating that the UAV enters into the first TA from the second TA.

The UAV according to the above example embodiments or the UAV configured to perform the example method 1400 according to the above embodiments may be enabled to provide LPI in different frequencies, or even stop providing LPI periodically, based on the notification/instruction from the UTM server, which may include stopping obtaining LPI through a GNSS. Lowering the frequency of providing LPI or even stop providing LPI may be helpful for increasing the endurance of the UAV by saving power, for example.

In the above one or more example embodiments, the first information is sent by the first UAV via the CN to the UTM server. In another example embodiment, the first information may be sent by the CN. For example, when the CN determines a TA change for a UAV, the CN may send the first information indicating the first and second TAs of the UAV to the UTM server.

Figure 17:
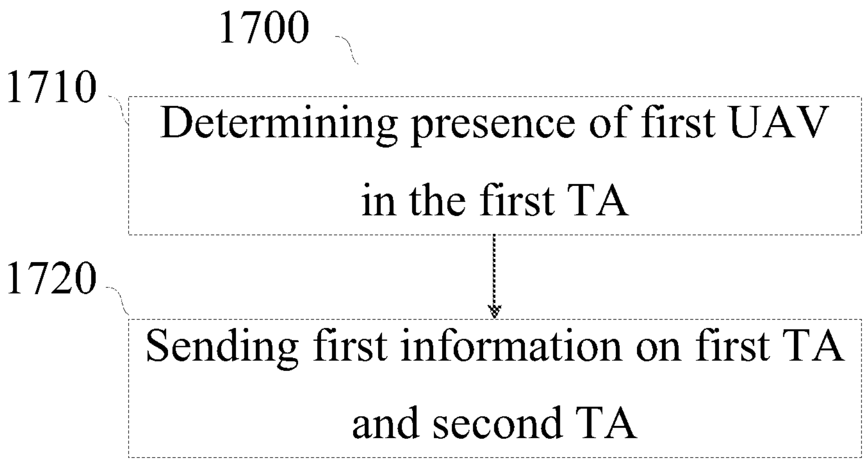
FIG. 17 shows an example method performed on the side of CN according to an example embodiment.

FIG. 17 shows an example method 1700 on the side of CN 130 according to an example embodiment. As shown in FIG. 17, the example method 1700 may include a step 1710 of determining presence of a first UAV in a first TA, for example based on TA attach/registration request or TAU request or Registration Update request from the UAV, or TA handover of the UAV, or the like. As shown in FIG. 17, the example method 1700 may further include a step 1720 of sending first information on the first TA and a second TA, the first UAV entering into the first TA from the second TA.

Figure 18:
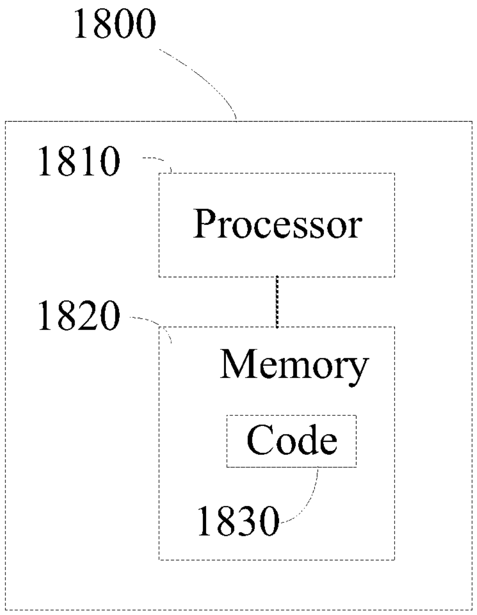
FIG. 18 shows an example apparatus on the side of CN according to an example embodiment.

FIG. 18 shows an example apparatus 1800 on the side of CN 130 according to an example embodiment. As shown in FIG. 18, the example apparatus 1800 may include at least one processor 1810 and at least one memory 1820 that may include computer program code 1830. The at least one memory 1820 and the computer program code 1830 may be configured to, with the at least one processor 1810, cause the example apparatus 1800 to perform at least the example method 1700 described above.

Further, the example apparatus and the example UAV described may included in a system according to an example embodiment. For example, the system may include at least one UAV described above which, for example, includes the above first UAV, and an apparatus for UAV traffic management described above which may be at least a part of the UTM server 120, for example the example apparatus 1100 or 1200. In another example, the system may further include a device of the Core Network, for example the example apparatus 1700.

Figure 19:
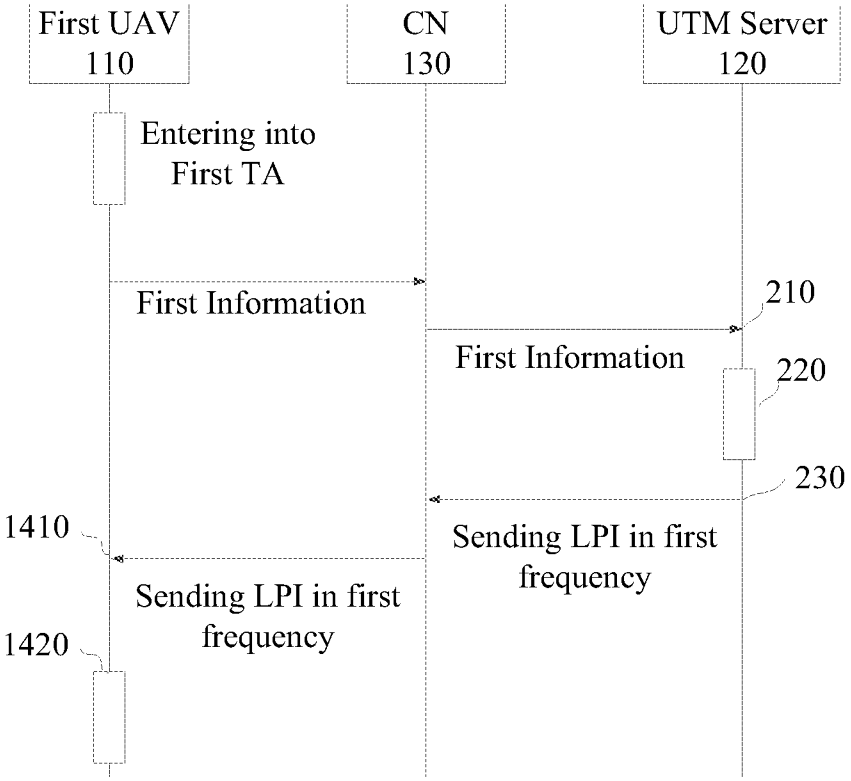
FIG. 19 shows a part of example communications in the system according to an example embodiment.

FIG. 19 shows an example procedure of communications between the first UAV (e.g. the first UAV 110) of at least one UAV and the apparatus (e.g. the UTM server 120) in the system according to an example embodiment.

As shown in FIG. 19, the first UAV 110 may send the first information to the UTM server 120 via CN 130 when the first UAV 110 enters into the first TA.

Then, on the side of the UTM server 120, in response to receiving the first information from the CN 130 at the step 210 of the example method 200, the step 220 of the example method 200 may be executed, and the UAV 110 may be notified at the step 230 of the example method 200 via the CN 130 to send LPI in a first frequency if the first number is one.

Then, on the side of the UAV 110, in response to receiving the notification of sending LPI in the first frequency at the step 1410 of the example method 1400, the UAV 110 may control sending of the LPI based on the received information at the step 1420 of the example method 1400. For example, when the first frequency has a zero value, the UAV 110 may stop providing LPI to the UTM server 120 via the CN 130.

Figure 20:
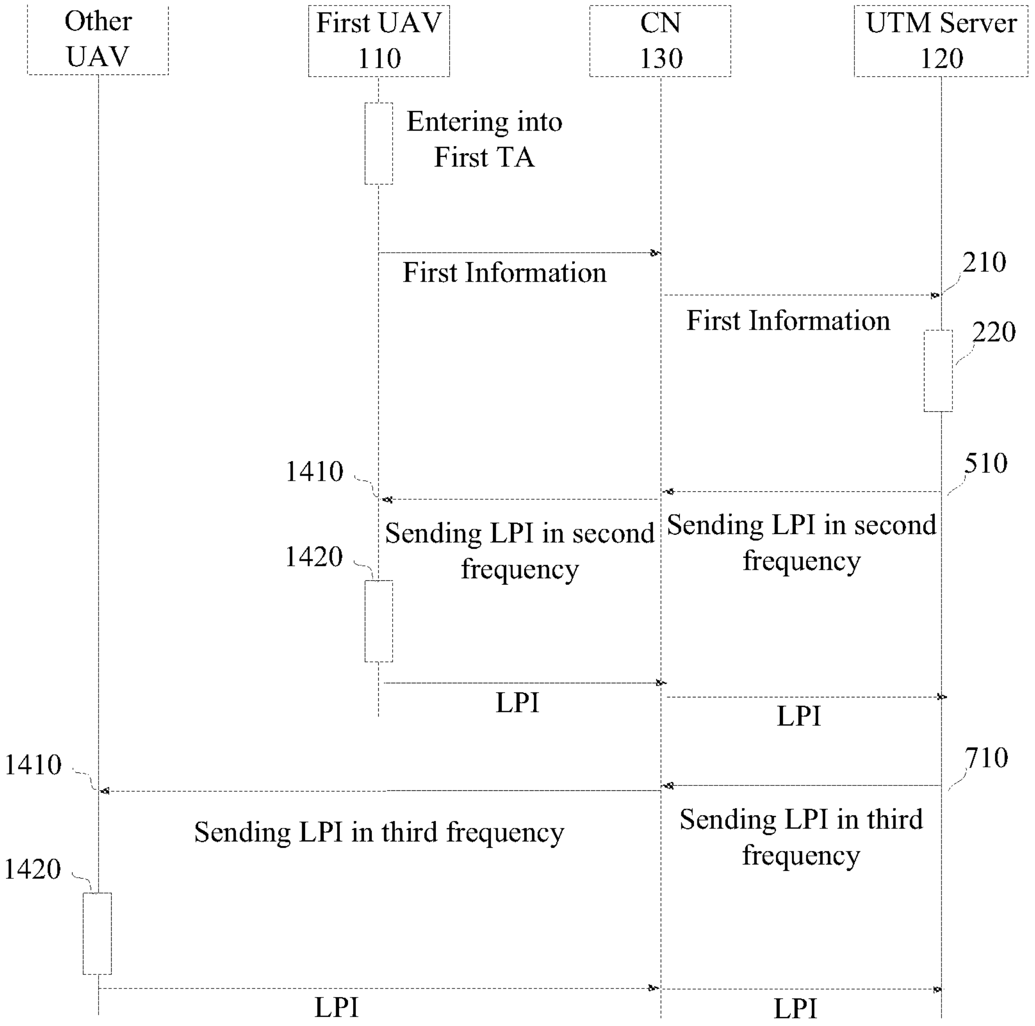
FIG. 20 shows a part of example communications in the system according to an example embodiment.

FIG. 20 shows another example procedure of communications between the other UAV than the first UAV 110 and the apparatus (e.g. the UTM server 120) in the system according to an example embodiment, wherein the other UAV may be in the first TA or in a neighboring TA.

Different from the example in FIG. 19, at the step 220 of the example method 200, the UTM server 120 determines that the first number is greater than one. Then, as shown in FIG. 20, on the side of the UTM server 120, the steps 510 and 710 of the example method 200 may be executed so as to notify the first UAV and the other UAV to send LPI in the third frequency greater than the first frequency.

Then, on the side of the first UAV and the other UAV in the first TA or a neighboring TA, LPI may be provided to the UTM server 120 via the CN 130 continuously with the instructed third frequency.

Figure 21:
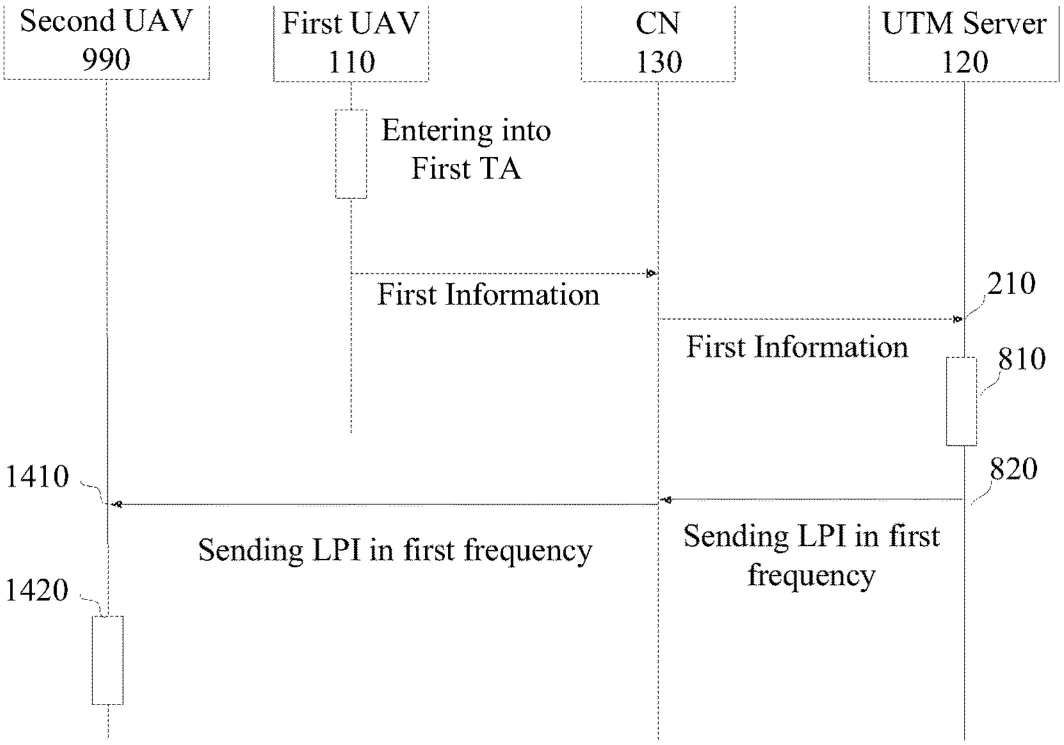
FIG. 21 shows a part of example communications in the system according to an example embodiment.

FIG. 21 shows another example procedure of communications between the aforementioned second UAV (e.g. the UAV 990 in FIG. 9) and the apparatus (e.g. the UTM server 120) in the system according to an example embodiment.

As shown in FIG. 21, on the side of the UTM server 120, in response to receiving the first information from the first UAV 110 at the step 210 of the example method 200, the step 810 of the example method 200 may be executed. When the second number determined in the step 810 is one, a notification to the second UAV 990 may be sent at the step 820 of the example method 200 so as to indicate the second UAV 990 to send LPI in the first frequency.

Then, on the side of the UAV 610, in response to receiving the notification of sending LPI in the first frequency at the step 1410 of the example method 1400, the UAV 110 may control sending of the LPI based on the received information at the step 1420 of the example method 1400. If the first frequency has a zero value, the UAV 990 may stop providing LPI to the UTM server 120 via the CN 130, for example.

Figure 22:
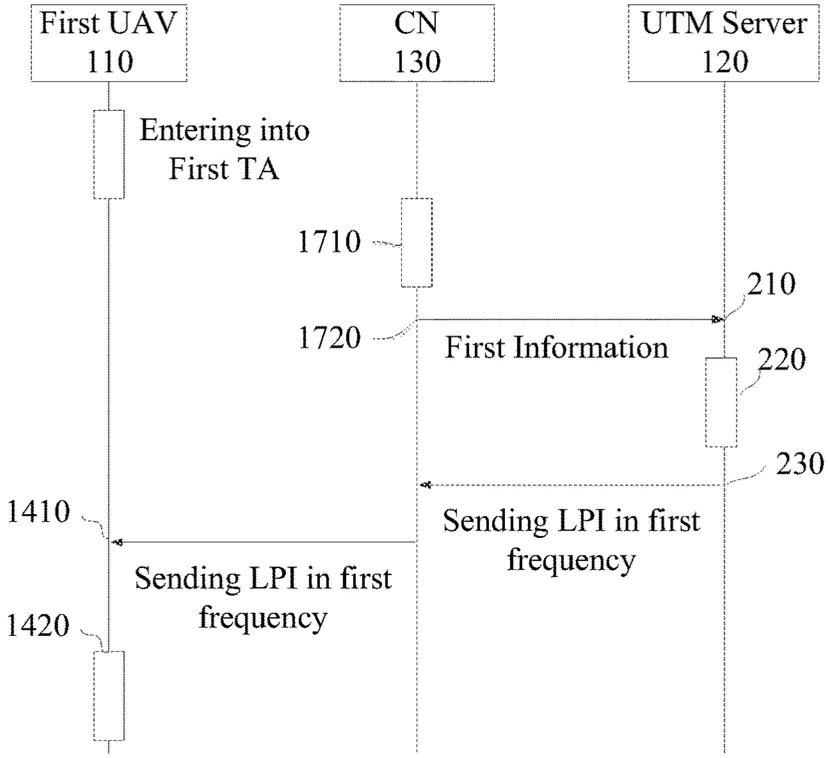
FIG. 22 shows a part of example communications in the system according to an example embodiment.

In the example procedures as shown in FIGS. 19-21, the first UAV 110 is responsible for sending the first information. As described above, the system may also include a device of the CN 130 which may be responsible for sending the first information to the UTM server 120. FIG. 22 shows an example procedure of communications in this case.

As shown in FIG. 22, the device of CN 130 may determine presence of the first UAV in the first TA at the step 1710 of the example method 1700. For example, when the device of the CN 130 determined that the first UAV enters into the first TA from the second TA, it may send the first information indicating the first TA and the second TA to the UTM server 120 at the step 1720 of the example method 1700.

Then, in response to receiving the first information, the UTM server 120 may perform operations similar to those in FIG. 19.

It is appreciated that the procedures of communications among entities in the system are not limited to the above examples.

Another example embodiment may relate to computer program codes or instructions which may cause an apparatus (e.g. at least a part of the UTM server 120) or a UAV to perform at least respective methods described above.

Another example embodiment may be related to a computer readable medium having such computer program codes or instructions stored thereon. In various example embodiments, such a computer readable medium may include at least one storage medium in various forms such as a volatile memory and/or a non-volatile memory. The volatile memory may include, but not limited to, for example, a random-access memory (RAM), a cache, and so on. The non-volatile memory may include, but not limited to, a read only memory (ROM), a hard disk, a flash memory, and so on.

Although various example embodiments are described with a UAV as an example, the solution for collision avoidance of the present disclosure may also be applied any other type of mobile enabled device, such as a vehicle and a robot.

Further, while various example embodiments are described above with the first TA and one or more TAs neighboring the first TA directly as examples, as described above, the first TA and the one or more TAs may be neighbors either directly or indirectly. That is, the number of UAVs may be determined in a larger area.

Figure 23:
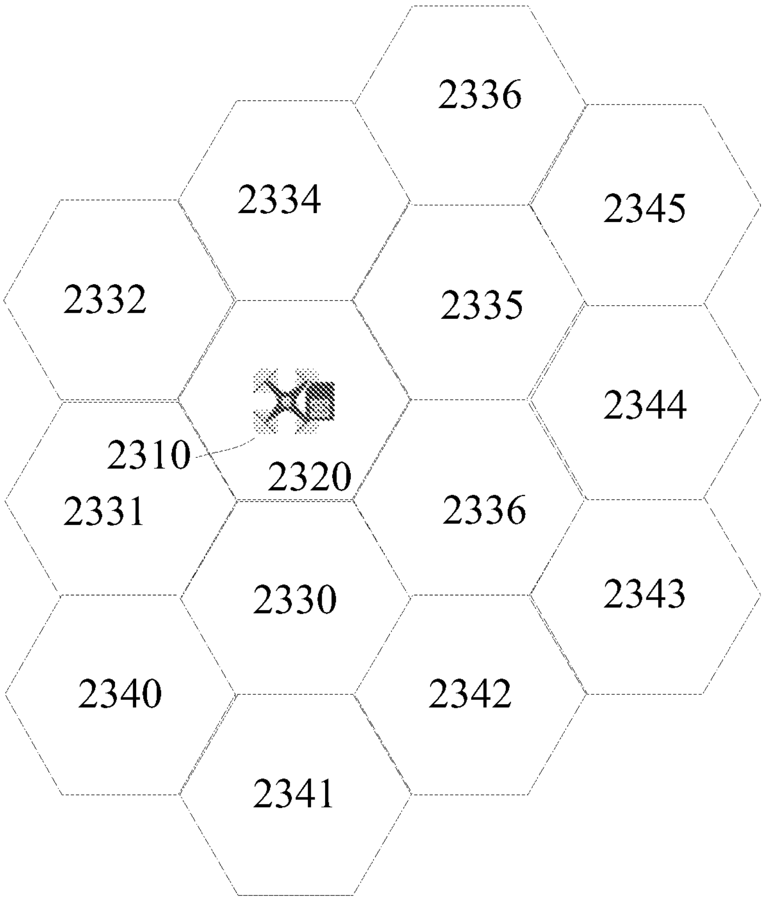
FIG. 23 shows an example of neighboring TAs according to an example embodiment.

For example, as shown in FIG. 23, for the UAV 2310 in the TA 2320, a number of UAVs in TA 2320, TAs 2330-2336 neighboring the TA 2320 directly, and TAs 2340-2345 neighboring the TA 2320 indirectly may be determined, for example in the above step 220 of the example method 200 where the UAV 2310 corresponds to the first UAV, or in the above step 810 of the example method 200 where the UAV 2310 corresponds to the second UAV. Then, if the determined number is one, the UAV 2310 may be notified to send LPI in the first frequency or even to stop sending LPI if the first frequency has a zero value.

Further, a tracking area in various example embodiments may be an area which may have at least similar functions/features with the current tracking area configuration, for example, a Radio Access Network based notification area (RNA) or any other suitable area for position management of a UE currently or in the future.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some example embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. The order of these blocks may also be changed. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method comprising:
receiving first information on presence of a first unmanned aerial vehicle UAV in a first tracking area TA, wherein the first TA comprises one or more cells in a telecommunication network, and wherein the UAV is configured to send live positioning information over the telecommunication network;
determining a first number of UAVs in the first TA and at least one TA neighboring the first TA; and
configuring the first UAV to send the live positioning information in a first frequency in a case where the first number is one.

2. The method of claim 1 further comprising:
notifying the first UAV to send the live positioning information in a second frequency greater than the first frequency in a case where the first number is greater than one.

3. The method of claim 2 further comprising:
notifying other one or more UAVs in the first TA and the at least one neighboring TA than
the first TA to send the live positioning information in a third frequency greater than the first frequency in the case where the first number is greater than one.

4. The method of claim 1 wherein the first information indicates that the first UAV enters into the first TA from a second TA.

5. The method of claim 4 further comprising:
in a case where a second UAV is within a third TA neighboring the second TA, determining a second number of UAVs in the third TA and at least one TA neighboring the third TA; and
notifying the second UAV to send the live positioning information in the first frequency in a case where the second number is one.

6. The method of claim 1 wherein the first frequency has a zero value indicating a stop of sending live positioning information.

7. The method of claim 1 further comprising:
receiving first live positioning information and second live positioning information from two UAVs in the same TA or two adjacent TAs, respectively;
estimating a risk of collision between the two UAVs based on the first live positioning information and the second live positioning information; and
issuing a route change command to at least one of the two UAVs in a case where the risk is above a threshold.

8. The method of claim 1 wherein each UAV is a Mobile Enabled Device communicating with Unmanned Aerial System Traffic Management.

9. The method of claim 1 wherein the first information is received from the first UAV via a Core Network.

10. The method of claim 9 wherein the first information is received from the Core Network in a case where the first UAV moves into the first TA.

11. The method of claim 1 wherein each TA includes one or more cells in a telecommunication network.

12. The method of claim 1 wherein the at least one TA neighboring the first TA includes at least one TA neighboring the first TA directly and/or indirectly.

13. An apparatus comprising:
at least one processor; and
at least one memory including computer program code, the at least one memory and the computer program code being configured to, with the at least one processor, cause the apparatus to perform:
receiving first information on presence of a first unmanned aerial vehicle UAV in a first tracking area TA, wherein the first TA comprises one or more cells in a telecommunication network, and wherein the UAV is configured to send live positioning information over the telecommunication network;
determining a first number of UAVs in the first TA and at least one TA neighboring the first TA; and
configuring the first UAV to send the live positioning information in a first frequency in a case where the first number is one.

14. The apparatus of claim 13 wherein the at least one memory and the computer program code are further configured to, with the at least one processor, cause the apparatus to perform:
notifying the first UAV to send the live positioning information in a second frequency greater than the first frequency in a case where the first number is greater than one.

15. The apparatus of claim 14 wherein the at least one memory and the computer program code are further configured to, with the at least one processor, cause the apparatus to perform:
notifying other one or more UAVs in the first TA and the at least one neighboring TA than the first TA to send the live positioning information in a third frequency greater than the first frequency in the case where the first number is greater than one.

16. An unmanned aerial vehicle (UAV) comprising: at least one processor; and
at least one memory including computer program code, the at least one memory and the computer program code being configured to, with the at least one processor, cause the UAV to perform:
receiving information on a frequency for sending live positioning information, wherein the frequency is based on a presence of another UAV in a tracking area TA, and wherein the TA comprises one or more cells in a telecommunication network; and
controlling sending of the live positioning information over the telecommunication network based on the received information.

17. The UAV of claim 16 wherein the controlling sending of the live positioning information comprises:
stopping sending of the live positioning information in a case where the frequency has a zero value.

18. The UAV of claim 16 wherein the at least one memory and the computer program code are further configured to, with the at least one processor, cause the UAV to perform:
sending information indicating that the UAV enters into a first tracking area from a second tracking area.

19. The UAV of claim 16 wherein the UAV is a Mobile Enabled Device communicating with Unmanned Aerial System Traffic Management server via a Core Network.

* * * * *